United States Patent [19]

Hirata et al.

[11] 3,796,861

[45] Mar. 12, 1974

[54] INFORMATION CARD READ-OUT DEVICE

[75] Inventors: Shinichi Hirata; Iwao Mitsugi, both of Kanagawa-ken; Toshiya Ogawa; Masayuki Suzaki, both of Tokyo; Takami Suzuki, Kanagawa-ken, all of Japan

[73] Assignee: Kabushiki Kaisha Ricoh, Tokyo, Japan

[22] Filed: Mar. 30, 1971

[21] Appl. No.: 129,519

[30] Foreign Application Priority Data

Apr. 22, 1970 Japan ................................ 45/39514

Apr. 22, 1970 Japan ................................ 45/39517

[52] U.S. Cl. ..................235/61.11 C, 235/61.11 D, 340/174.1 A

[51] Int. Cl. .............................................. G06k 7/04

[58] Field of Search..............235/61.11 C, 61.11 D, 235/61.11 E, 61.11; 178/7.3 S; 340/174.1 A; 250/219 DD, 219 DC

[56] References Cited

UNITED STATES PATENTS

| | | | |
|---|---|---|---|
| 3,187,166 | 6/1965 | Bean | 235/61.11 C |
| 1,745,019 | 1/1930 | Korn | 250/219 DD |
| 2,769,379 | 11/1956 | Perry | 250/219 DD |
| 3,351,744 | 11/1967 | Masterson | 235/61.11 E |
| 3,178,175 | 4/1965 | Hohmann | 235/61.11 B |

*Primary Examiner*—Maynard R. Wilbur
*Assistant Examiner*—Robert F. Gnuse
*Attorney, Agent, or Firm*—McGlew and Tuttle

[57] ABSTRACT

A rotatable disk is stepped angularly to produce successive timing pulses, and card feed rollers are stepped angularly in synchronism with the disk, to shift the information card column-by-column in accordance with the timing pulses. The information is read-out when the card is stationary following each stepped advance of the card. Upon completion of reading out of the information in all of the card columns, the last timing pulse is extended or prolonged and, during prolongation of the last timing pulse, a read-out termination signal is produced by an end cam. Blocking means are provided to prevent insertion of a second card into the device unitl reading out of a first card has been completed.

10 Claims, 5 Drawing Figures

INFORMATION CARD READ-OUT DEVICE

BACKGROUND OF THE INVENTION

In reading out of a marked card, a punched card, or other type of information card, it is impossible to read out the information accurately, or to connect the read-out device operatively to associated equipment, unless at least some means is provided for ascertaining the time of introduction of a card into a read-out section or the time of removal of a card therefrom.

It has been proposed to use detection devices relying on a detection switch or a photoelectric transducer element which is actuated as the card moves, as means for ascertaining the time of introduction of the card into the read-out section or removal of the card from this section. Such detection devices have disadvantages because a read-out device, using a detection switch, is not reliable in performance and a read-out device using a photoelectric transducer element is high in cost.

These disadvantages can be obviated by using a device in which an end cam, rotated in synchronism with card feed rollers, is utilized. However, when an end cam is used, the terminal portion of the card will be read, by error, unless the end cam is engaged during the very short interval of time between the termination of read-out of all the columns of the card and the production of a following read-out pulse. Stated another way, only a very short time interval is assigned to the engaging of the end cam in such a device, so that severe limitations are placed on the design of the end cam mechanism.

SUMMARY OF THE INVENTION

This invention relates to information card read-out devices and, more particularly, to such a read-out device, employing an end cam, which is free of the disadvantages of prior art read-out devices.

The objective of the invention is the provision of an information card read-out device utilizing one timing pulse, such as the last timing pulse in a cycle, as a sort of read-out inhibition pulse. The timing pulse produced when all the columns of a card have been read out has a long duration, so that the end cam can produce a read-out termination signal during the duration of the last timing pulse. This arrangement is effective to ease the conditions of designing of the end cam, and to permit a read-out termination pulse to be produced positively.

In accordance with the invention, there is provided an information card read-out device wherein the timing pulse produced upon completion of read-out of all the columns of the card is maintained in its "rise" position for a relatively long time so that the transfer of read-out information may be prevented during this period. The read-out termination pulse is produced during the rise period of the timing pulse, so that the reading of erroneous information, at the trailing end portion of the card, can be prevented. In addition, the protuberance of the end cam can be so designed that the read-out termination pulse is produced at any time as desired during the duration of the rise time of the last timing pulse. This also greatly facilitates design of the end cam.

An object of the invention is to produce an improved and simplified information card read-out device.

Another object is to produce such a device in which one timing pulse is extended or prolonged to provide a time period during which an end cam can produce a termination pulse.

A further object of the invention is to provide such a device greatly facilitating design of the end cam.

Another object of the invention is to provide such a read-out device including safety means preventing insertion of a following card into the device before the information on a preceding card has been completely read out.

For an understanding of the principles of the invention, reference is made to the following description of typical embodiments thereof as illustrated in the accompanying drawing.

DESCRIPTION OF THE PREFERRED EMBODIMENTS

Figure 1:
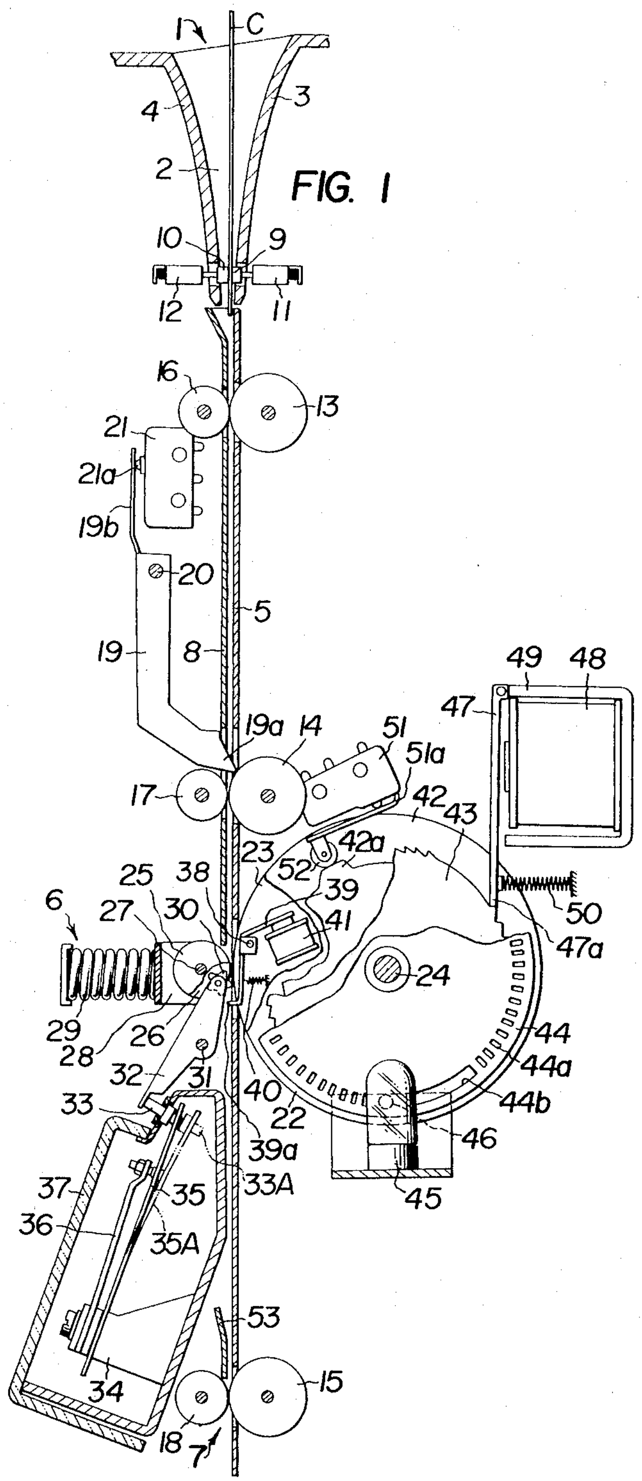
FIG. 1 is a part sectional and part side elevation view of a punch card read-out device in accordance with one embodiment of the invention.

Referring to FIG. 1, a punch card read-out device, incorporating the invention, is illustrated as of the lengthwise read type with a single leaf input system, for use with a punch card having 80 columns and 12 bits, such as for use with a data collector or the like. However, it should be understood that the principles of the present invention are applicable not only to punch card read-out devices, such as described with reference to the drawing, but also to read-out devices for other types of information cards.

Referring more in detail to FIG. 1, a card inlet 1 and a card passage 2 contiguous therewith are defined by guide plates 3 and 4. A guide plate 5, which is continuous with guide plate 3, prolongs passage 2 to read-out section 6 which is connected to a card outlet 7. A guide plate 8, continuous with guide plate 4, is positioned in facing relation with guide plate 5 in that portion of guide plate 5 extending to read-out section 6.

At the inner ends of guide plates 3 and 4 there are disposed passage width limiting members 9 and 10 adapted to be reciprocated by respective electromagnetic plungers 11 and 12, between a position in which their forward ends are spaced apart from each other to leave passage 2 fully open and a position in which the spacing between the forward ends thereof is in excess of the thickness of one card but less than the thickness of two cards. The latter position is assumed by members 9 and 10 during the read-out of information.

Card delivery rollers 13, 14 and 15 are connected to suitable drive means (not shown) and mounted in spaced relation to each other along the guide plate 5 side of passage 2. Roller 13 is positioned near the forward end of guide plate 5, and rollers 14 and 15 are disposed, respectively, at the inlet and at the outlet of read-out section 6. Cooperating card delivery rollers 16, 17 and 18 are mounted on the guide plate 8 side of passage 2, and are biased by springs or the like to press against the respective guide rollers 13, 14 and 15 with a relatively weak force.

A detector 19*a*, of a card movement detecting pivotal member 19, is disposed in card passage 2 near rollers 14 and 17. Member 19 is pivotally supported by a shaft 20, and has an arm 19*b* which is positioned against a pushbutton 21*a* of a microswitch 21. Switch 21 is closed when the forward end of a punch card C, fed into the device through inlet 1, engages and moves detector 19*a* of member 19 after being nipped by rollers 13 and 16 and advanced thereby.

Axially spaced card feed rollers 22 and 32, supported by a shaft 24, are mounted in card passage 2 on the guide plate 5 side of read-out section 6, in a manner such that their peripheral surfaces are positioned against opposite marginal portions of the card inserted into inlet 1. The circumference of rollers 22 and 23 has a length slightly greater than the length of a card C. Shaft 24 is connected to suitable drive means through a friction clutch (not shown), and rollers 22 and 23 are secured to rotate with shaft 24. Axially spaced pressure rollers 25 and 26, mounted at the terminal end of guide plate 8, are arranged to press against rollers 22 and 23, respectively. Rollers 25 and 26 are supported by a shaft 27 which is rotatably supported by a support 28. In turn, support 28 is suitably supported for sliding motion in a direction to engage rollers 25 and 26 with feed rollers 22 and 23, respectively. Rollers 25 and 26 are caused to press against the respective feed rollers 22 and 23 under the bias of a compression spring 29 which biases support 29 to the right as viewed in FIG. 1.

Star wheels 30, having a number and spacing equal to the bits of the punch card or, in the present case, 12 star wheels, are arranged in a row and are mounted between pressure rollers 25 and 26 in a manner such that they are slightly displaced from the contact tangent of rollers 25 and 26. Star wheels 30 are supported by first arm ends of respective pivoted levers 32 which are pivotal on a shaft 31. The opposite arms of levers 32 engage respective intermediate actuation pins 33 pivotally mounted in a row on an upper surface of a case 37 of an information signal producing switch board 34.

The bases of pins 33 are connected to resilient movable contacts 35, which are normally biased to come into contact with respective fixed contacts 36. Thus, levers 32, through pins 33, are biased to urge star wheels 30 to moved into the card passage. When no holes are punched into card C in a particular column, the card retains star wheels 30 out of the card passage, and the movable contacts 35 are shifted, with pins 33, to the position shown in dash and dot lines 33A and 35A, in which movable contacts 35 are separated from fixed contacts 36. Case 37 of switch board 34 is formed of a transparent acrylic resin, or the like, and completely shields switch board 34, thereby preventing intrusion of dust or other foreign matter into the switch board.

An initial stage positioning member 39 is disposed between feed rollers 22 and 23 in a portion of card passage 2 disposed in read-out section 6. Member 29 is pivotally supported by a shaft 38, and normally biased by a spring 34 to move in a direction such that a locking portion 39*a*, at one arm of member 29, is moved out of the card passage. The other arm of member 39 constitutes an armature of an electromagnet 41, which is energized when switch 21 is closed, thereby permitting locking portion 39*a* of member to move into the card passage.

Figure 2:
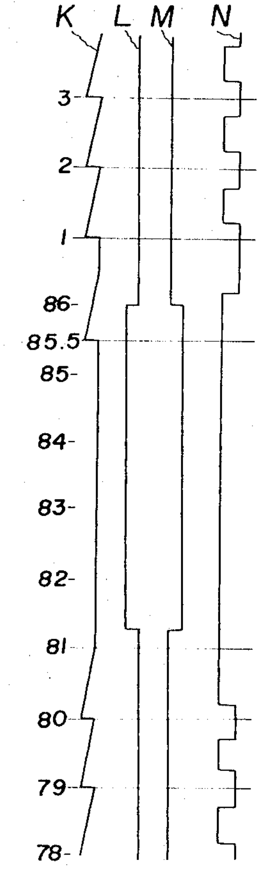
FIG. 2 is a fragmentary schematic view of an operation time chart for the device shown in FIG. 1.

An end cam 42, a ratchet wheel 43 and a timing disk 44 are secured to shaft 24 supporting card feed rollers 22 and 23. The outer marginal portion of timing disk 44 is formed with slits 44*a* for producing timing pulses equal in number to the columns of punch card C, or 80 in the particular embodiment illustrated. The 80 slits 44*a* are arranged in sequence and at equal angular spacings from each other to cover the major part of the outer marginal portion of disk 44, and a slot 44*b* is disposed between slits 44*a* at opposite ends of the circular row of slits 44*a*. A light source 45 is a photoelectric transducer element 46 are positioned on opposite sides of the outer marginal portion of disk 44. When disk 44 is rotated, the light from light source 45 passes through slits 44*a*, or through arcuate slot 4*b*, to be incident on photoelectric transducer element 46 to produce timing pulses as shown in FIG. 2 (K).

A ratchet engaging pivotal member 47 has a pawl 47*a* at its forward end and adapted to engage a tooth of ratchet wheel 43. Member 47 is pivotally supported at its base end by a fixed frame 49 for an electromagnet 48. When electromagnet 48 is deenergized, member 47 is biased by a spring 50 to move toward ratchet wheel 43 so that pawl 47*a* is engaged with one of the teeth of the ratchet wheel. Electromagnet 48 is adapted to be momentarily energized, upon receipt of an operation command from a control section, when a timing pulse is produced as mentioned above, to attract member 47 to the electromagnet. During the time member 47 is attracted toward electromagnet 48, and pawl 47*a* is disengaged from ratchet wheel 43, ratchet wheel 43 is advanced through a distance corresponding to one tooth or to the spacing between adjacent teeth. By repeating this operation, card feed rollers 22 and 23 feed punch card C column-by-column.

End cam 42 has formed, on its peripheral surface, a protuberance 42*a* engaged with a roller 52 of an actuator 51*a* of a microswitch 51. End cam 42 cooperates with switch 51 to produce an end pulse (see FIG. 2L), which serves to indicate that card feed rollers 22 and 23 are in the initial stage, or that the trailing end of the punch card has passed the feed rollers.

The operation of the illustrated punch card read-out device will now be described. If punch card C is inserted in card inlet 1, the card will pass between passage width limiting members 9 and 10 which are then in a position to leave card passage 2 open, will be moved by delivery rollers 13 and 14 along card passage 2, will engage and move, with its forward end, detector 19*a* of member 19, and will be nipped by delivery rollers 14 and 17. When detector 19*a* is moved out of card passage 2 by the forward end of card C, switch 21 is closed to energize electromagnet 41 to bring the locking portion 39*a* of initial stage positioning member 39 into the card passage. Upon closing of switch 21, pressure rollers 25 and 26 and star wheels 30 are temporarily moved out of the card passage by suitable means which have not been illustrated. This permits the forward end of card C, nipped by rollers 14 and 17, to move readily along the card passage until it abuts against locking member 39*a* of initial stage positioning member 39 and stops. This places delivery rollers 13, 16 and 14, 17 in conditions in which slip occurs between the delivery rollers.

This effects the initial positioning, for read-out of card C. The spacing between the first column on the card and the advance positions of the star wheels is so determined that it corresponds to 1.5 teeth of ratchet wheel 43. Simultaneously with effecting of the initial positioning of card C, electrically controlled pressure rollers 25 and 26 are brought into pressing engagement with card feed rollers 22 and 23, respectively, and star wheels 30 are brought into engagement with card C. The initial stage positioning member 39 is retracted out of the card passage as electromagnet 41 is deenergized, thereby permitting the initiation of reading out of card C.

At this time, an operation command is supplied to electromagnet 48 and the latter is momentarily energized to attract member 47 to release pawl 47*a* from ratchet wheel 43. The positions of the teeth of ratchet wheel 43 are as shown in FIG. 2 (K). When ratchet engaging pawl 47*a* is released from engagement with ratchet wheel 43 in the initial stage, wheel 43 moves angularly from a tooth in a position 85.5 to a tooth in a position 1, it being noted that there are no teeth between positions 85.5 and 1. The tooth in position 1 is engaged and locked by pawl 47*a* of member 47, which is restored to its initial position upon deenergization of electromagnet 48. The rotation of ratchet wheel 43, or the angular advance thereof, causes feed rollers 22 and 23 to advance angularly through an angle equal to the angle of advance of ratchet wheel 43, so as to feed card C and then stop motion of the card. The position in which the card stops corresponds to a position in which star wheels 30 read out the information in the first column of card C.

As ratchet wheel 43 is stepped angularly, as mentioned, end cam 42 rotates with wheel 43 and its protuberance 42*a* is released from engagement with roller 52 of switch 51 to operate actuator 51*a*. Switch 51 cooperates with end cam 42 to produce an end pulse as shown in FIG. 2 (L), and, at the same time, operates electromagnetic plungers 11 and 12 for passage width limiting members 9 and 10, respectively, as shown in FIG. 2 (M). Upon operation of plungers 11 and 12, the respective passage width limiting members 9 and 10 move into card passage 2 to hold, very loosely, the trailing end of card C1 (FIG. 3) which is being read out. Plungers 11 and 12 are maintained in operative positions until card C1 is removed from the read-out section. This is effective to prevent a following card, which might be inadvertently inserted in inlet 1, from being permitted to be moved to the read-out section 6, because movement of the following card is blocked by the members 9 and 10.

As ratchet wheel 43 steps angularly from the initial stage to the tooth in position 1, timing disk 44 also rotates through the same angle and stops after slot 44*b* has just passed between light source 45 and photoelectric transducer element 46. A pulse is produced continuously as the light from source 45 passes through slot 44*b*, and is incident on element 46 during the initial card positioning stage, as shown in FIG. 2 (N), so that the timing pulse is used for ascertaining an introduction of the card into the read-out section. Ratchet wheel 43 stops completely when this extended timing pulse has terminated. When card C1 is disposed in a predetermined position, the information in the first column is transferred through the operation of star wheels 30 and their associated components.

When electromagnet 48 is momentarily energized for the second time, member 47 allows ratchet wheel 43 to move a distance corresponding to one tooth. Accordingly, feed rollers 22 and 23 shift card C1 by the spacing between adjacent columns, and star wheels 30 are disposed in a position in which the information in the second column of card C1 is read out. At this time, a first slit 44*a* of timing disk 44 passes between light source 45 and photoelectric transducer element 46, and produces a first timing pulse. An operation command is given by the control section so as to energize electromagnet 48 again. When this pulse has terminated, and card C1 is disposed in a stable state, the information in the second column is transferred. This cycle of operation is repeated so as to read-out continuously the information in the 80 columns. The transfer of read-out information is effected, for each column, while card C remains stationary as mentioned above. During this time period, the timing pulses are utilized for checking on the card feed and gating the transfer of the read-out information.

When the read-out of the information in the 80th column is finished, the next timing pulse is produced as the light passes through slot 44*b*. This last timing pulse of the cycle is extended, as shown in FIG. 2 (N). There are no teeth between the tooth in position 85.5 and the tooth in the position 80, on ratchet wheel 43, so that wheel 43 continues to rotate until the tooth in position 85.5 is engaged by pawl 47*a* of member 47, which latter has been restored to its original position.

Thus, card C1 is ready for discharge from read-out section 6. Simultaneously with the discharge of card C1 from read-out section 6, protuberance 42*a* of end cam 42 presses against roller 52 and renders actuator 51*a* of switch 51 inoperative, thereby rendering electromagnetic plungers 11 and 12 inoperative (see FIG. 2 (M)), and opening card passage 2 to be ready for movement of the next card therethrough. The card C1, discharged from read-out section 6, passes between guide plate 5 and the guide plate 53 facing guide plate 5, and is nipped by rollers 15 and 16 which discharge the card from the device. The read-out of the information contained in the next card is effected by repeating the described operation of the various elements.

It will be understood that the invention is not limited to the specific timing pulse producing means, and the manner of arranging the positions of the teeth of the ratchet wheel, as described above, and that changes may be made therein, or any suitable means can be used in an arbitrary fashion, without departing from the spirit and scope of the invention.

Figure 3:
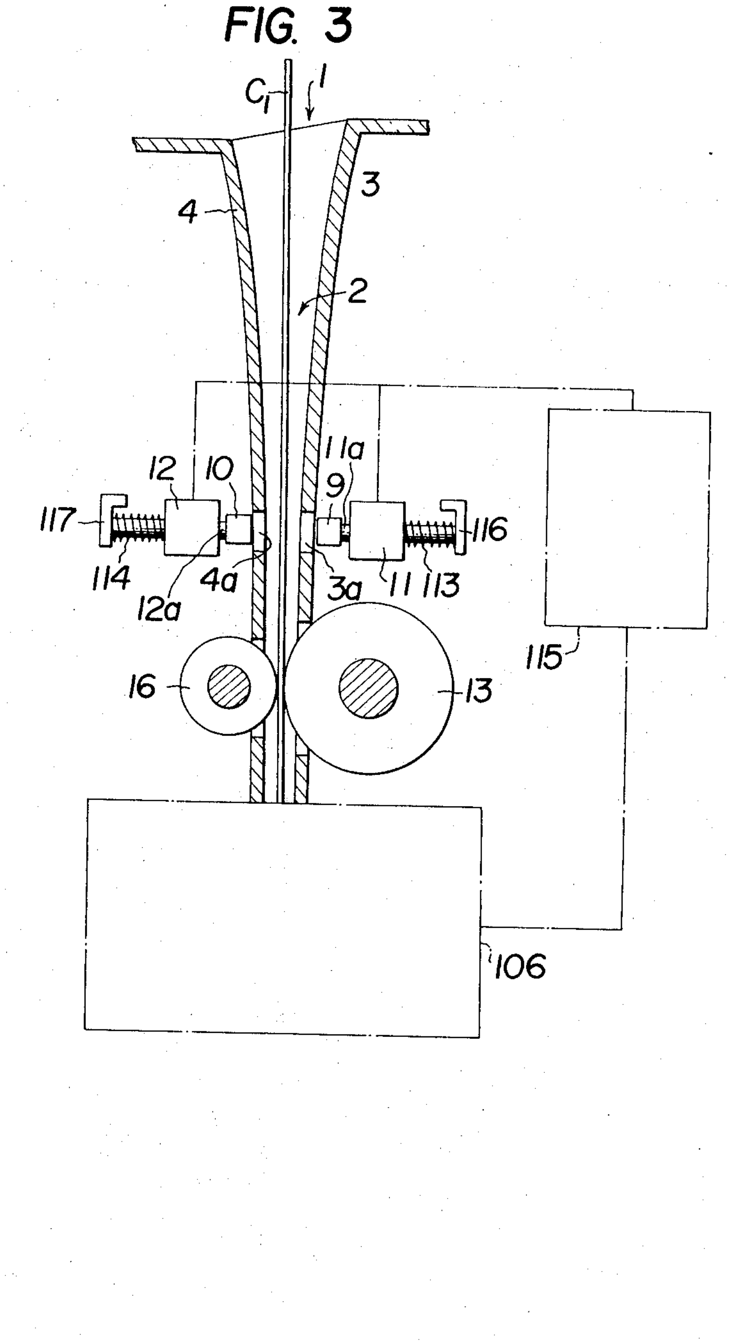
FIG. 3 is an enlarged sectional view, partly schematic, illustrating one form of information card input safety means incorporated in the read-out device shown in FIG. 1.

The information card insertion safety means incorporated in the device shown in FIG. 1 will now be described with reference to FIG. 3. Referring to FIG. 3, the terminal portions of guide plates 3 and 4, defining card inlet 1 and card passage 2 contiguous therewith, lead card passage 2 through card delivery rollers 13 and 16 to a read-out section 106 which corresponds to the read-out section 6 described with reference to FIG. 1. Read-out section 106 may be a read-out means of the photoelectric type.

Card passage width limiting members 9 and 10 are disposed in facing relation through openings 3*a* and 4*a* formed in the respective guide plates 3 and 4 in a portion of passage 2 near inlet 1. Members 9 and 10 are secured to actuators 11*a* and 12*a* of the respective electromagnetic plungers 11 and 12 disposed in corresponding positions on opposite sides of passage 2. Actuators 11*a* and 12*a* are biased by respective springs 113 and 114, embracing the actuators, to move members 9 and 10 to a position in which they are retracted and leave card passage 2 fully open, as shown in FIG. 3, and when plungers 11 and 12 are inoperative. Plungers 11 and 12 are connected to control means 115 which may be, for example, the switch 21 of FIG. 1, adapted to be closed by an operation initiation signal produced by read-out means 106.

Figure 4:
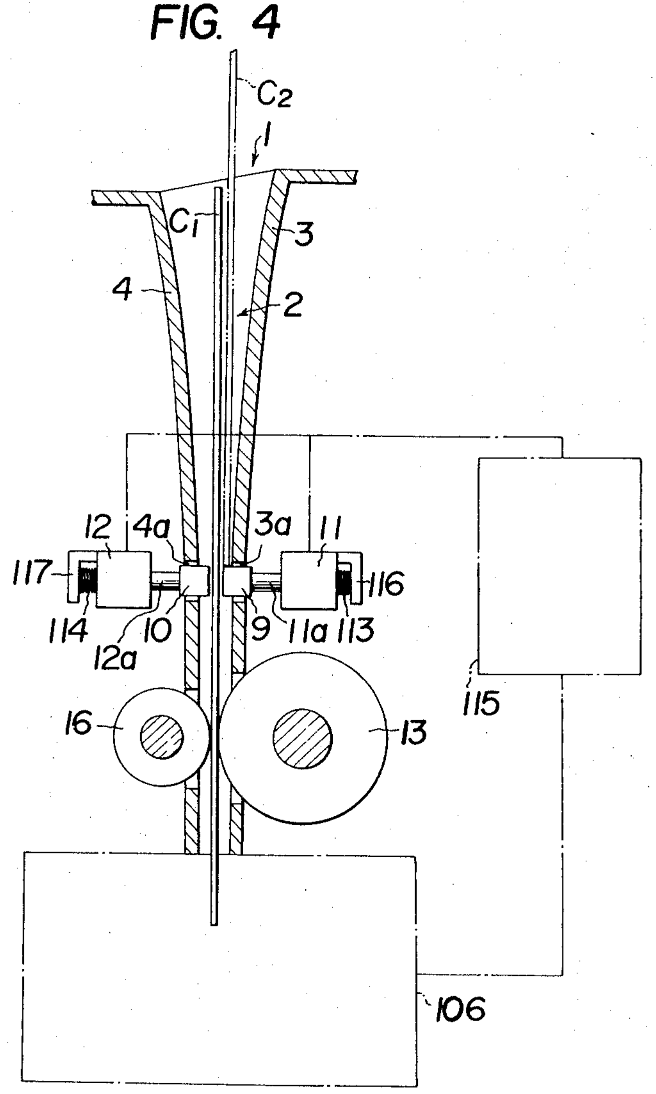
FIG. 4 is a view similar to FIG. 3 illustrating the operation of the information card input safety means.

Plungers 11 and 12 are operative as soon as read-out is initiated following the initial positioning of the card C1, so that actuators 11*a* and 12*a* move in a direction to advance members 9 and 10 into card passage 2, as shown in FIG. 4. Stops 116 and 117 are provided at the rear ends of actuators 11*a* and 12*a*, respectively, to determine the clearance between the facing forward ends of members 9 and 10 in card passage 2 in a manner such that the clearance is greater than the thickness of one card but less than the thickness of two cards. Accordingly, cards C1, inserted in inlet 1 and being read out, is held loosely, at its trailing end, between members 9 and 10 and moved into card passage 2.

In place of the mentioned electric plungers, any suitable means, such as linkage which is rendered operative by the movement of a card, may be used as the means for supporting and moving card passage width limiting members 9 and 10 between a retracted position and a position in which they restrict the passage so that the passage width is greater than the thickness of one card but less than the thickness of two cards.

Preferably, members 9 and 10 are actuated at the same time as information card C1 is inserted in inlet 1, or at least before read-out is initiated following insertion of card C1. As long as this condition is satisfied, any other means may be used for actuating the members 9 and 10, for example, means for effecting control of the movement of the members 9 and 10 by detecting the movement of the card along the passage. This is also the case with the embodiment of the invention shown in FIG. 5.

Control means 115 is so constructed that, as soon as read-out of information card C1 by read-out means 106 is finished, it renders electromagnetic plungers 11 and 12 inoperative to move members 9 and 10 to their original position. Thus, card passage 2 is fully opened as soon as read-out of card C1 is finished.

The card insertion safety feature of the invention prevents a following card C2 (see FIG. 4), inserted in inlet 1, from moving into read-out means 106, by virtue of members 9 and 10 being moved into card passage 2 while the preceding card C1 is being read out, thereby preventing two cards from being fed at the same time to read-out means 106. This feature is also effective to retain the next card C2 in inlet 1 to be ready for the next read-out operation, even if card C2 is inserted in inlet 1 while card C1 is being read out. This permits immediately feeding the next card C2 to read-out means 106 when card passage width limiting members 9 and 10 are moved to the retracted position leaving card passage 2 fully open following completion of the read-out of card C1. Thereby, the stand-by time for read-out of cards is reduced.

In the embodiment of the invention shown in FIGS. 3 and 4, the following card C2 might pass through the small clearance between members 9 and 10 in card passage 2 while card C1, previously inserted in inlet 1, is in read-out means 106 after passing between members 9 and 10. This can be prevented by constructing members 9 and 10 so that their upper surfaces are slightly inclined so that they may diverge toward their forward ends.

Figure 5:
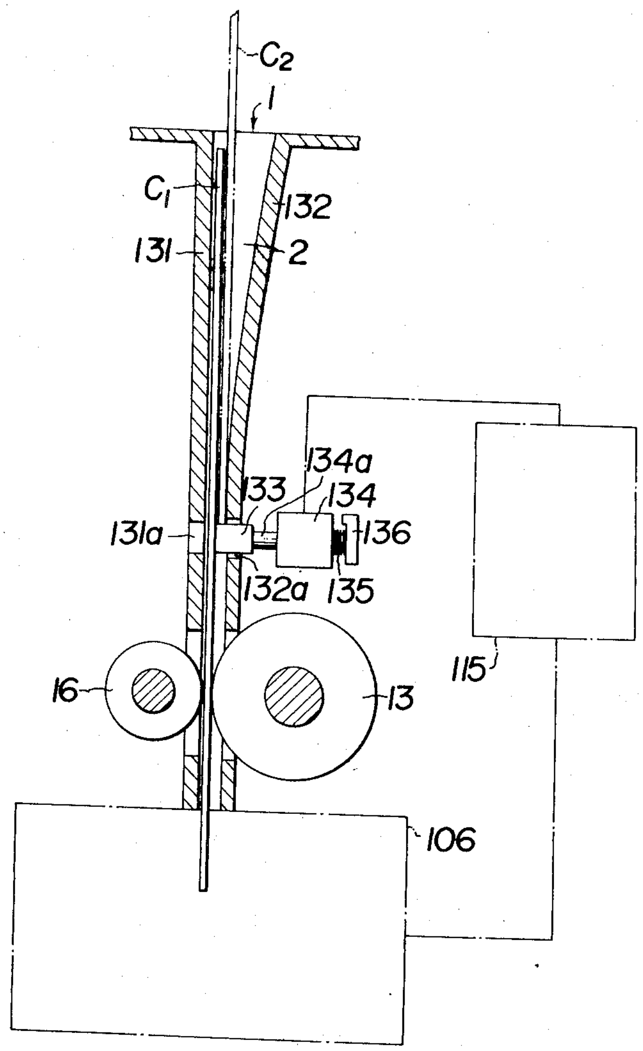
FIG. 5 is a view, similar to FIGS. 3 and 4, illustrating another embodiment of the information card input safety means.

FIG. 5 illustrates another embodiment of the card insertion safety means and comprising only one card passage width limiting member disposed on one side of the card passage. Parts illustrated in FIG. 5 which are the same as those in FIGS. 3 and 4 are indicated by the same reference numerals.

In FIG. 5, card inlet 1 and card passage 2 are defined by an upright guide 131 and a tapered or diverging guide 132, which guides face each other. A card passage width limiting member 133 is disposed on paper guide 132, and is secured to an actuator 134*a* of an electromagnetic plunger 134. When plunger 134 is operative, member 133 is biased by spring 135 to a position in which it leaves the card passage fully open. When the read-out of card C1 is initiated, for example, control means 115 is actuated to render electromagnetic plunger 134 operative, so that member 133 is moved through an opening 132*a*, formed in tapered guide 132, by plunger 134 and into a position in which it closes card passage 2. At this time, member 133 presses, at its forward end, the trailing end portion of card C1, being read out, against upright guide 131. The force with which plunger 134 is operated is limited so that the forward end of member 133 presses lightly against card C1.

After the trailing end of card C1 has passed member 133, this member is moved further forwardly into an opening 131*a* formed in upright guide 31, so as to fully close passage 2. The distance covered by the movement of member 133 can be adjusted by means of a stop 136 provided at the rear end of actuator 134*a*. Opening 131*a* may be replaced by a recess or eliminated.

When the card insertion safety means comprises only one card passage width limiting member 133, as described in connection with FIG. 5, two cards might be fed together to the read-out means 106 or might become stuck in the passage in case the next following card C2 is held between preceding card C1 and guide 131, on which no passage width limiting member is provided. This can be prevented by using upright guide 131 as illustrated, or by providing a projection or plate in the portion of inlet 1 on the side of guide 131 to preclude the passage of a card through such portion.

In the embodiments described, card passage 2 has been described as being perpendicular to the horizontal. However, the present invention is not limited to this form of card passage, and the card passage may be disposed horizontally, inclined to the horizontal, or in any other orientation as desired. Also, the relative positions of card delivery rollers 13 and 16, or of other corresponding card delivery means, and of the card passage width limiting members, may be varied as desired depending on the design conditions. The card passage width limiting members may be planar, rod-shaped, or any form as desired.

While specific embodiments of the invention have been shown and described in detail to illustrate the application of the principles of the invention, it will be understood that the invention may be embodied otherwise without departing from such princples.

What is claimed is:

1. A read-out device, for information cards having information arranged in transverse columns, comprising, in combination, a read-out section; means operable to feed a first card to said read-out section; timing pulse producing means operable to produce successive timing pulses for gating the transfer of the read-out information; card feed means operable, responsive to production of each timing pulse, to advance a card, column-by-column, through said read-out section; read-out means in said section operable to read out information in a respective column while a card is stationary following a card advancing step; means extending the last timing pulse in a cycle, upon completion of reading out of the information in all the card columns of the first card, to prevent transfer of erroneous information at the trailing end of the first card, following read-out of the last transverse column, while the first card is transferred out of said read-out section, said extended last timing pulse providing a pulse, at the beginning of the next cycle, ascertaining the introduction of a succeeding card into said read-out section; end cam mechanism operable in synchronism with said timing pulse producing means and producing a read-out termination signal during the duration of said last timing pulse.

2. A read-out device, as claimed in claim 1 in which said timing pulse producing means comprises a rotatable disk having timing pulse triggering means arranged around its marginal portion; said card feed means comprising card feed rollers rotated in synchronism with said disk.

3. A read-out device, as claimed in claim 2, in which said timing pulse triggering means comprises a plurality of relatively narrow slits arranged in said marginal portion of said disk; a light source positioned on one side of said disk to direct light through said slits; and a photoelectric transducer element positioned on the opposite side of said disk in alignment with said light source.

4. A read-out device, as claimed in claim 3, in which said disks are arranged in a circular row; and a relatively elongated arcuate slot in said marginal portion between the two ends of said row; said slot serving to produce said last timing pulse.

5. A read-out device, as claimed in claim 2, in which said end cam mechanism comprises a cam rotatable in synchronism with said disk; a switch operatively associated with said cam and operable, when closed, to produce said read-out termination signal; and a cam surface on said cam engaging an operator of said switch to close said switch during the duration of said last timing pulse.

6. A read-out device, for information cards having information arranged in transverse columns, comprising, in combination, a read-out section; timing pulse producing means operable to produce successive timing pulses; card feed means operable, responsive to production of each timing pulse, to advance a card, column-by-column, through said read-out section; read-out means in said section operable to read out information in a respective column while a card is stationary following a card advancing step; means extending the last timing pulse in a cycle, upon completion of reading out of the information in all the card columns; end cam mechanisms operable in synchronism with said timing pulse producing means and producing a read-out termination signal during the duration of said last timing pulse; a card passage extending from said inlet through said read-out section; and safety means movable into said card passage, responsive to movement of a first card therealong and into said read-out section, to block insertion of a second card into said card passage until termination of the reading out of the first card; said safety means comprising a pair of plungers arranged in opposed relation on opposite sides of said card feed passage; said plungers being movable from a retracted position into said card feed passage to a position wherein the spacing therebetween is at least equal to the thickness of one card but less than the thickness of two cards.

7. A read-out device, for information cards having information arranged in transverse columns, comprising, in combination, a read-out section; timing pulse producing means operable to produce successive timing pulses; card feed means operable, responsive to production of each timing pulse, to advance a card, column-by-column, through said read-out section; read-out means in said section operable to read out information in a respective column while a card is stationary following a card advancing step; means extending the last timing pulse in a cycle, upon completion of reading out of the information in all the card columns; end cam mechanisms operable in synchronism with said timing pulse producing means and producing a read-out termination signal during the duration of said last timing pulse; a card passage extending from said inlet through said read-out section; and safety means movable into said card passage, responsive to movement of a first card therealong and into said read-out section, to block insertion of a second card into said card passage until termination of the reading out of the first card; said safety means comprising a plunger positioned adjacent an aperture in one side wall of said card feed passage and movable through said aperture toward the opposite side wall of said feed passage; said plunger lightly engaging a card in said feed passage and, when released by the trailing end of such card, moving completely across said card feed passage.

8. A read-out device, for information cards having information arranged in transverse columns, comprising, in combination, a read-out section; means operable to feed a first card to said read-out section; timing pulse producing means operable to produce successive timing pulses for gating the transfer of the read-out information; card feed means operable, responsive to production of each timing pulse, to advance a card, column-by-column, through said read-out section; read-out means in said section operable to read out information in a respective column while a card is stationary following a card advancing step; means extending the last timing pulse in a cycle, upon completion of reading out of the information in all the card columns of the first card, to provide a pulse, at the beginning of the next cycle, ascertaining the introduction of a succeeding card into said read-out section; end cam mechanisms operable in synchronism with said timing pulse producing means and producing a read-out termination signal during the duration of said last timing pulse; a card passage extending from said inlet through said read-out section; and safety means movable into said card passage, responsive to movement of a first card therealong and into said read-out section, to block insertion of a second card into said card passage until termination of the reading out of the first card.

9. A read-out device, for information cards having information arranged in transverse columns, comprising, in combination, a read-out section; means operable to advance a first card to said read-out section; timing pulse producing means operable to produce successive timing pulses for gating the transfer of the read-out information; card feed means operable, responsive to production of each timing pulse, to advance a card, column-by-column, through said read-out section; read-out means in said section operable to read out information in a respective column while a card is stationary following a card advancing step; means extending the last timing pulse in a cycle, upon completion of reading out of the information in all the card columns of the first card to ascertain the introduction of a succeeding card into said read-out section; end cam mechanisms operable in synchronism with said timing pulse producing means and producing a read-out termination signal during the duration of said last timing pulse; said timing pulse producing means comprising a rotatable disk having timing pulse triggering means arranged around its peripheral portion; said card feed means comprising card feed rollers rotated in synchronism with said disk; a ratchet wheel rotatable with said disk and having ratchet teeth each corresponding with a respective timing pulse triggering means; a pawl engageable with said ratchet teeth; and means operable to release said pawl momentarily from engagement with said ratchet teeth to permit angular advance of said disk through the distance of one tooth; said read-out means reading out information in a respective column when said ratchet wheel is held stationary by engagement of said pawl with a ratchet tooth.

10. A read-out device, for information cards having information arranged in transverse columns, comprising, in combination, a read-out section; means operable to advance a first card to said read-out section; timing pulse producing means operable to produce successive timing pulses for gating the transfer of the read-out information; card feed means operable, responsive to production of each timing pulse, to advance a card, column-by-column, through said read-out section; read-out means in said section operable to read out information in a respective column while a card is stationary following a card advancing step; means extending the last timing pulse in a cycle, upon completion of reading out of the information in all the card columns of the first card, to ascertain the introduction of a succeeding card into said read-out section; end cam mechanisms operable in synchronism with said timing pulse producing means and producing a read-out termination signal during the duration of said last timing pulse; an information card inlet; a card feed passage connecting said inlet to said read-out section; a card detector projecting across said feed card passage and engageable by the leading end of an information card to be moved out of said feed card passage; a switch operated by such movement of said card detecting member; a card retaining member projectable in said passage to hold a card in an initial position in said read-out section; and means operable, responsive to operation of said switch by said card detecting member, to move said card retaining member across said card feed passage.

* * * * *